United States Patent

Sirovich et al.

[11] Patent Number: 5,833,389
[45] Date of Patent: Nov. 10, 1998

[54] APPARATUS FOR CONTROLLING TURBULENCE IN BOUNDARY LAYER AND OTHER WALL-BOUNDED FLUID FLOW FIELDS

[75] Inventors: Lawrence Sirovich, New York, N.Y.; Eugene Levich, Tel-Aviv; Lucien Y. Bronicki, Yavne, both of Israel; Sture Karlsson, Providence, R.I.

[73] Assignee: Orlev Scientific Computing Ltd., Yavne, Israel

[21] Appl. No.: 766,380

[22] Filed: Dec. 9, 1996

[51] Int. Cl.⁶ ........................................ E02B 3/02
[52] U.S. Cl. ................... 405/52; 138/39; 405/80
[58] Field of Search ................ 405/52, 118, 79, 405/80, 87, 25, 26; 138/37–39

[56] References Cited

U.S. PATENT DOCUMENTS

| | | |
|---|---|---|
| 1,994,045 | 3/1935 | Nelson . |
| 2,800,291 | 7/1957 | Stephens . |
| 3,741,285 | 6/1973 | Kuethe . |
| 4,455,045 | 6/1984 | Wheeler . |
| 5,263,793 | 11/1993 | Sirovich . |
| 5,354,017 | 10/1994 | Levich . |
| 5,595,205 | 1/1997 | Sirovich et al. . |

FOREIGN PATENT DOCUMENTS

| | | |
|---|---|---|
| 0 216 384 A | 11/1987 | European Pat. Off. . |
| 0 726 398 A | 8/1996 | European Pat. Off. . |
| 0794 841 A | 2/1936 | France . |
| WO 84 03867 A | 10/1994 | WIPO . |

*Primary Examiner*—Dennis L. Taylor
*Attorney, Agent, or Firm*—Donald M. Sandler

[57] ABSTRACT

Turbulence is controlled in boundary layer or wall-bounded fluid flow fields having a turbulent wall region which under natural conditions, has an average system of roll pairs or streaks adjacent the surface, and extending in the direction of flow, by locally introducing into the turbulent wall region, by passive means, a disturbance that enhances or inhibits the roll pairs thereby locally increasing or decreasing the turbulence in the flow field.

29 Claims, 2 Drawing Sheets

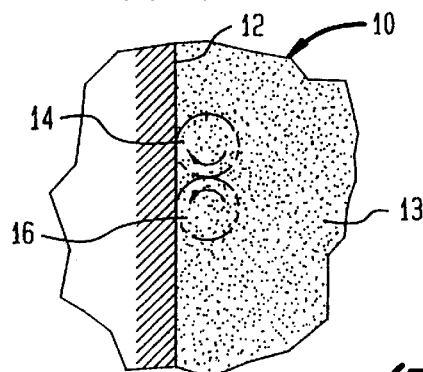
FIG. 1
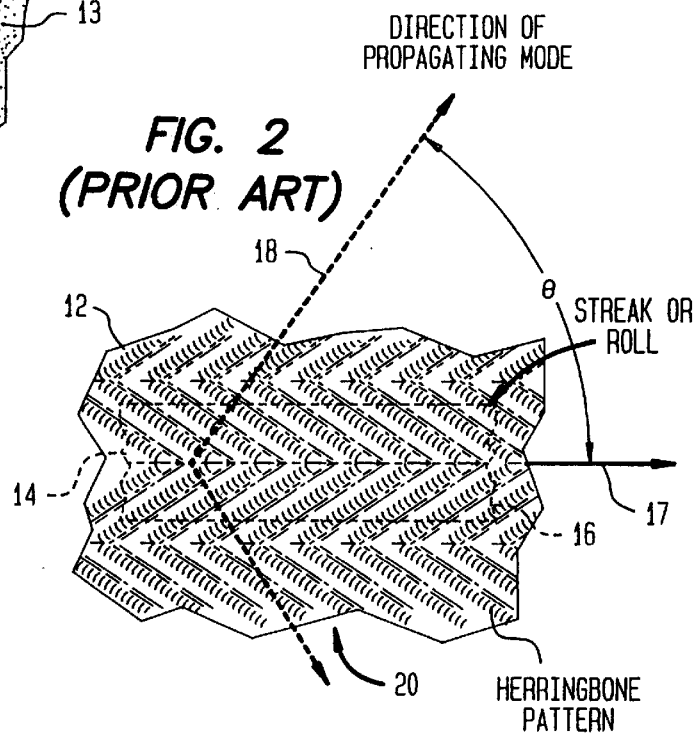
FIG. 2
(PRIOR ART)
FIG. 3
(PRIOR ART)
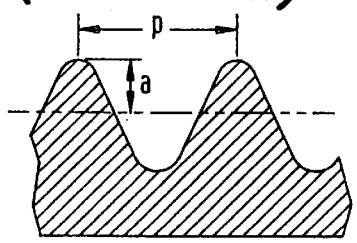
FIG. 4
(PRIOR ART)
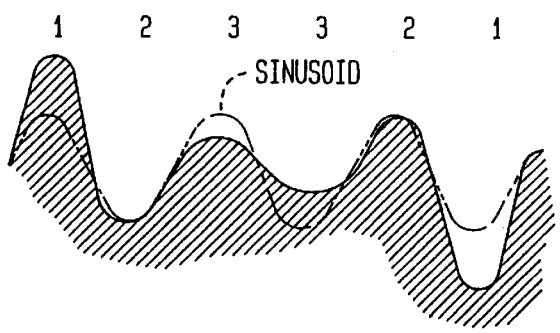

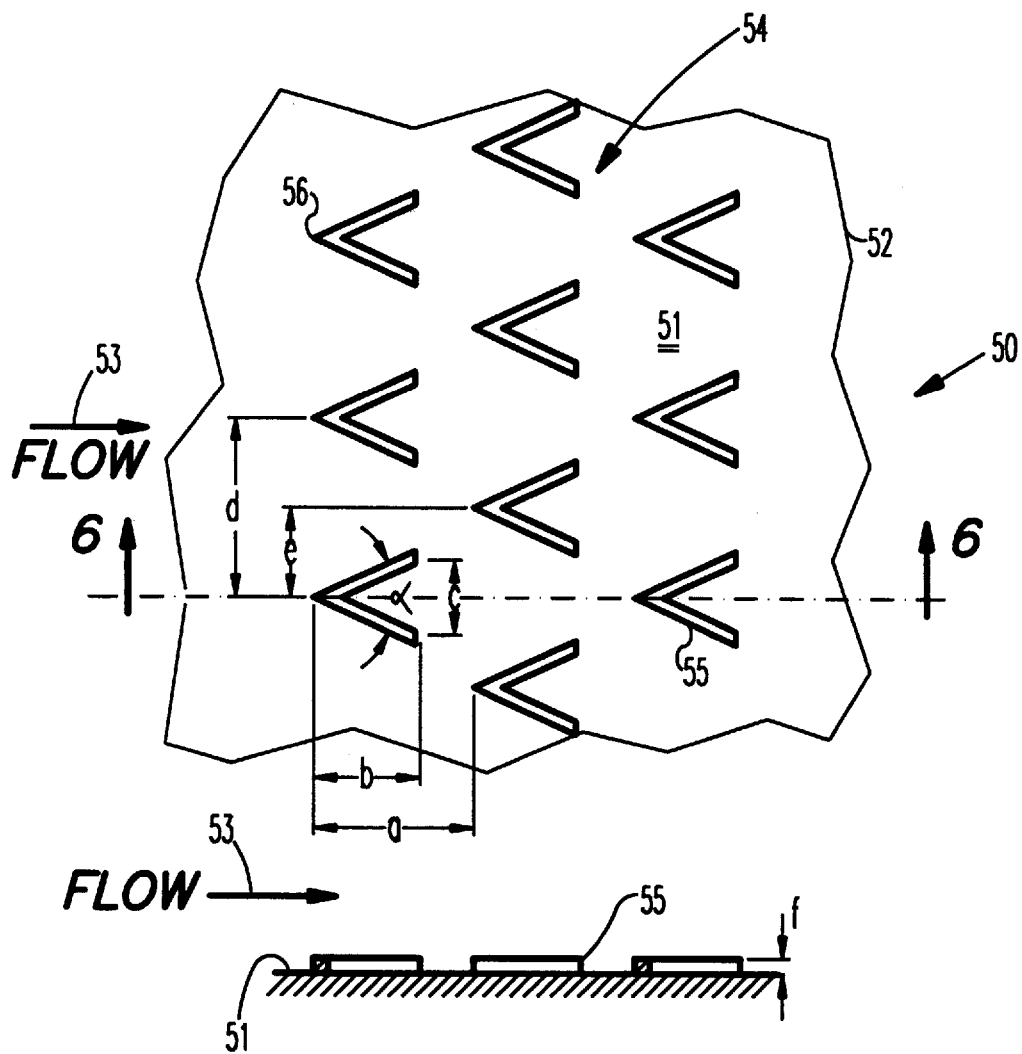

APPARATUS FOR CONTROLLING TURBULENCE IN BOUNDARY LAYER AND OTHER WALL-BOUNDED FLUID FLOW FIELDS

DESCRIPTION

1. Technical Field

This invention relates to a method of and apparatus for controlling turbulence in boundary layer and other wall-bounded fluid flow fields.

2. Background Art

U.S. Pat. No. 5,263,793 issued Nov. 23, 1993, and U.S. Pat. No. 5,354,017 issued Oct. 11, 1994, the disclosures of which are hereby incorporated by reference, view turbulence as having coherent patterns of activity in the midst of apparent chaos. Specifically, these patents and the publications cited therein, describe turbulent flow as being characterized by a system of roll pairs extending in the direction of flow, and obliquely propagating structures interacting with the system of roll pairs. These structures apparently propagate at a constant group speed, and are described as being triggers for the bursting of the roll pairs which give rise to drag. The most important of the propagating modes, are apparently those that propagate at an angle of about 70° from the streamwise direction; and those in the range 50°–800° appear to contain the dominant energy content of the propagating modes.

These roll pairs, which are sometimes referred to as streaks, counter-rotate and lie adjacent the bounding walls at the outer edge and beyond the sublayer. They show considerable meander and variation in their dynamic activity. Of great importance is their sudden contortion or kinking, resulting in a sudden bursting forth of slow moving fluid from near the wall into the fast moving main body of fluid motion. This bursting results in a net drag on the walls. It has been estimated that these bursts, which account for 80% of the drag on a wall, occur only roughly 20% of the time. Again, a study of the patterns of such flow shows that the contortion of the rolls undergoes a stereotypical coherence pattern through temporal change that is typical of all wall-bounded turbulence.

To specify the size of the streaks, it is first necessary to recognize that the streaks are a manifestation of local conditions beyond the sublayer of the flow adjacent to a wall, and not of the nature of the wall, nor of the flow field significantly spaced from the wall. Local conditions are fully specified by the average frictional stress at a wall, s, the density of the fluid, r, and the viscosity of the fluid, m. These quantities define a local size dimension, or length scale $1_*$ which is usually referred to as a wall unit and is equal to $m/(sr)^{1/2}$. The dominant roll diameter is nominally 50 to 100 wall units, or $100\, 1_*$ to $200\, 1_*$ per pair.

The term "dominant", in referring to the roll diameter, means that the greatest amount of turbulent energy (of the fluctuating velocity) resides in modes of activity of this size. There is, in addition, other modes of the same roll type, having a range of sizes and which also contain significant amounts of turbulent energy.

According to the two patents cited above, turbulence in a medium is controlled by locally introducing into the turbulent wall region two separate disturbances that are effective to produce, in a local region, a composite disturbance field that is strongly coupled to and modifies the obliquely propagating structures in a manner that increases or decreases the interaction of the propagating structures with the system of roll pairs thereby locally increasing or decreasing the turbulence in the flow field. One of the disturbances may be caused by passive means such as the interaction of the fluid with an array of strips of delta-shaped protrusions positioned spanwise on the wall (i.e., transverse to the flow direction) with the apices of the protrusions pointed upstream of the flow; and the second disturbance may be caused by active means such as injecting energy into the local region by active mechanical, electrical, or hydrodynamical means.

It is an object of the present invention to provide a method of and apparatus for simplifying the management of turbulent flow using certain types of passively created disturbances. These disturbances may also be created by active means.

BRIEF DESCRIPTION OF THE INVENTION

According to the present invention, turbulent drag may be reduced in boundary layer or other wall-bounded fluid flow fields having a turbulent wall region characterized by the natural system of average roll pairs or steaks adjacent to the surface of a wall, by introducing into the wall region by passive means, a disturbance that inhibits the creation of, or breaks up, the roll pairs utilizing a two-dimensional array of protrusions on, or cavities in, the wall surface. Preferably, the array includes a plurality of protrusions arranged in successive rows perpendicular to the direction of fluid flow, the protrusions of a succeeding row being staggered relative to the protrusions of a preceding row, either in a regular or random manner. The elements of a row may be uniformly placed, or randomly advanced or retarded within a row.

Preferably, the protrusions project into the flow a distance in the range 5 to 15 wall units, where a wall unit (1*) is as defined above; and the protrusions are V-shaped with apices directed upstream to the direction of flow (i.e., pointing in the direction from which the flow comes). The apex angle of the protrusions is preferably in the range 20°–90°. The pitch of the protrusions in a row preferably is in the range of one protrusion per 100–300 wall units, and the pitch of the protrusions in the direction of flow is in the range of one row per 200–400 wall units. Preferably, the dimension of the protrusions in the direction of flow is in the range 150–250 wall units.

Increased mixing (i.e., increased drag) is achieved with the same type of protrusions, but placed in an unstaggered manner, with uniform columns and rows.

BRIEF DESCRIPTION OF DRAWINGS

Embodiments of the present invention are described by way of example with reference to the accompanying drawings wherein:

FIG. 1 is a cross-section showing wall-bounded fluid flow, where the cross-section is taken perpendicular to the direction of flow;

FIG. 2 is a schematic plan view of the fluid flow field shown in FIG. 1 showing streaks or rolls adjacent a wall boundary having herring-bone undulations;

FIG. 3 is a cross-section through the wall showing the undulations;

FIG. 4 is a modified version of the undulations;

FIG. 5 is a portion of a wall containing protrusions according to the present invention; and FIG. 6 is a sectional view of the wall taken along the line 6—6 of FIG. 5.

DETAILED DESCRIPTION

Referring now to the drawings, reference numeral 10 designates a wall-bounded turbulent flow field including wall 12 restraining fluid 13 containing local statistical structures in the form of counter-rotating rolls 14, 16 of fluid. The axes of these rolls, or streaks as they are sometimes called, lie, on the average, in the direction of fluid flow which is into the paper showing FIG. 1, and as indicated by arrow 17 in FIG. 2. Briefly, the counter rotating rolls have, on the average, a length much greater than their diameters (approximately 1000 $1_*$). As indicated above, the dominant roll size is roughly 100 $1_*$, to 200 $1_*$ per pair.

In fully developed turbulent flow, these local roll structures travel downstream throughout the near wall region, are disrupted, contort, and finally burst (i.e., are ejected from the wall region). In the patents cited above, the interaction between the coherent structure of propagating modes present in the flow and the coherent structure of the rolls was considered to be the basis for the bursting of the rolls, and the consequent mixing of slow moving fluid near the boundary with rapidly moving fluid in the main flow and vice versa. These patents provided both passive and active mechanisms for controlling the triggering aspects of the wave propagating modes which were alleged to participate in the bursting of the roll-modes in turbulent wall-bounded flows.

A passive mechanism, according to the invention in the cited patents, for controlling the wave propagation modes is the presence of shaped modifications, such as grooves, undulations, etc. on the walls containing the turbulent flow. For example, the shape modifications can be achieved by actually grooving the walls, or by applying to the walls an adhesive layer which contains the required shapes. When the shape modification is in the form of undulations, their amplitude should be in the range 5–20 wall units in order to include the location of peak turbulence production. The wavelength or pitch of typical undulations will depend on the objective of the turbulence management. The orientation of the undulations, i.e., the direction of the troughs between the peaks of the undulations, should be inclined at about 10°–45° off the streamwise direction. That is to say, the "propagation" direction of the undulations should be about 60°–75° from the streamwise direction.

FIG. 2 shows a plan view of rolls 14, 16; and superimposed on these rolls are waves that propagate (the propagating modes) in the direction indicated by arrow 18 making an angle ±Θ with the flow direction 17. As indicated above, Θ lies in the range 10°–45° for the waves having the dominant energy content. To account for the possible bi-directional angle of the propagating modes, the undulations would be in the form of herring-bone-like pattern 20 as shown in FIG. 2, or a cross-hatched-like, or "knurled" pattern.

According to the cited patents, in order to enhance mixing and, for example, increase heat transport, (i.e., increase turbulence), and therefore to encourage the eruption of bursts, the undulations should be ordered in a strictly sinusoidal pattern as indicated in FIG. 3. The wavelength p is preferably in the range 100–300 wall units in order to achieve resonance with the triggering modes, and the amplitude a is preferably in the range 15–20 wall units.

In order to reduce drag, the undulations should be given a pattern that introduces phase interference in the waves in a manner that is analogous to the above-mentioned phase randomization. One method for achieving this is by creating a "chaotic" pattern modulation by the resonant wavelength, and containing a suitable sum of incommensurate sinusoids ranging down in wavelength. A model cross-sectional plot is given in FIG. 4.

According to the present invention, turbulent drag on a bounding surface can be controlled by introducing into a bounding wall region, by passive means, a disturbance that enhances or inhibits the creation of roll pairs thereby increasing or decreasing the turbulence in the flow field. When the disturbance enhances the creation of roll pairs, drag is increased; and when the disturbance inhibits the creation of roll pairs, drag is decreased.

The preferred manner of introducing disturbances of this type is by applying to the bounding walls a pattern of protrusions on, or cavities in, an otherwise smooth surface. The sizes of the protrusions or cavities, and the nature of the pattern of such protrusions or cavities, inhibits or enhances creation of roll pairs.

Referring now to FIG. 5, reference numeral 50 designates apparatus according to the present invention for inhibiting creation of roll pairs in a boundary layer or other wall-bounded fluid flow field whose direction is indicated by arrow 53, and which has a turbulent wall region adjacent surface 51 of wall 52. The direction of which is indicated by arrow 53. Applied to surface 51 are means for introducing into the wall region, by passive means, a disturbance that inhibits the creation of roll pairs. Such means, preferably, are in the form of a two-dimensional array 54 of protrusions 55 on surface 51. Alternatively, such means can be in the form of cavities in surface 51.

Preferably, array 54 is in the form of a plurality of protrusions arranged in successive rows perpendicular to the direction of fluid flow, the protrusions of a succeeding row being staggered, regularly, or randomly, relative to the protrusions of a preceding row. Preferably, the protrusions are V-shaped and have their apices directed opposite to the direction of flow. That is to say, apex 56 of a protrusion faces into the flow. While the sides that trail from the apex of a protrusion are shown as being straight, the sides may be curved either in a concave or convex manner. Furthermore, the apex angle a of the protrusions preferably is in the range 20°–90°.

The application of a pattern of protrusions according to the present invention may require changes in scale. Such is the case for turbulent boundary layers, as might be found on a wing of an aircraft or its fuselage. For growing boundary layers, scale sizes change slowing as the $\frac{1}{10}$ power of the streamwise distance.

As shown in FIG. 5, the pitch of the protrusions in the direction of flow (i.e., the row pitch of the pattern) is designated "a", and the dimension of the protrusions in the direction of flow is designated "b". The dimension of the protrusions in the direction perpendicular to the flow ( i.e., in the spanwise direction) is designated "c". The pitch of the protrusions in a direction transverse to the direction of flow (i.e., in the row direction) is designated "d"; and the offset between protrusions of a succeeding row and the protrusions of a preceding row (i.e., the stagger between columns) is designated "e". Finally, the height or thickness of the protrusions is designated "f".

Specific wall patterns have been tested in a close-return, low speed channel wind tunnel. The dimensions of the test section of the tunnel are: 5.5 cm high, 75 cm wide, and 850 cm long. A settling chamber 150 cm precedes the test section. Typical experimental Reynolds' numbers were in the range 10,800 to 18,000 corresponding to centerline velocities of 6–10 m/sec. The pattern was applied only to a portion of the floor of the test section.

Table A lists the dimensions, in millimeters, of a pattern tested which yielded drag reductions; and Table B lists the dimensions tested which yielded drag increases. Design 2 was evaluated with offset "e" fixed, or regular, and with the offset being random, in which case the value "e" represents the average value. Designs 3 and 4 were evaluated with offset "e" fixed.

TABLE A (Dimensions in millimeters)

| Dimension | Des. 2 |
|---|---|
| a | 13.9 |
| b | 10 |
| c | 9.1 |
| d | 13.5 |
| e | 6.75 |
| f | 0.25 |

TABLE B (Dimensions in millimeters)

| Dimen. | Des. 3 | Des. 4 | Des. 5 | Des. 6 | Des. 7 |
|---|---|---|---|---|---|
| a | 36.5 | 31.3 | 10.0 | 10.1 | 18.3 |
| b | 15.0 | 10.0 | 15.0 | 7.3 | 7.3 |
| c | 12.5 | 7.7 | 12.5 | 6.6 | 6.6 |
| d | 19.7 | 10.5 | 19.7 | 9.8 | 9.8 |
| e | 0 | 0 | 0 | 0 | 0 |
| f | 0.25 | 0.25 | 0.25 | 0.25 | 0.25 |

The following results were achieved for drag reduction using Design 2 with the offset being random (i.e., a randomly staggered pattern) for the flow velocities indicated (at 7 m/sec, one wall unit is approximately equal to 0.05 mm.):

| V(m/sec) | Drag change |
|---|---|
| 5.86 | −9.95% |
| 7.03 | −13.5% |
| 8.39 | −8.1% |
| 9.48 | −6.7% |
| 10.05 | −6.5% |

When the offset was fixed (i.e., a uniformly staggered pattern as shown in FIG. 6), drag reduction resulted, but under identical experimental conditions, it was significantly less than when the offset was random. Randomization also can be applied to the height of the protrusions as well as to the vee-shapes of a pattern.

The following results were achieved for mixing (i.e., drag increase) are:

| Vel.(m/sec) | 6 | 7 | 8 | |
|---|---|---|---|---|
| Drag(%) | +42.5 | +45.0 | +47.0 | Des. 3 |
| | +41.2 | +42.7 | +43.5 | Des. 4 |

In the case of mixing, offset "e" between protrusions of a succeeding row and the protrusions of a preceding row 20 (i.e., the stagger between columns), is zero. In other words, mixing is enhanced when the protrusions are not staggered. Patterns of this nature are suitable for heat exchange surfaces, etc.

When the protrusions are staggered, the invention is applicable to arbitrary fluid devices such as pipes and ducts of any cross-section, to vessels such as aircraft fuselages. boats, ships, etc., and to airfoils, as well as to channel flow which is illustrated in the above described experiments. Moreover, the invention is also applicable to active disturbances achieved through the use of MEMS, piezoelectric, and electohydrodynamic means of corresponding size and placement to the end that the disturbance interacts with the roll pairs.

The position of the V-shaped elements in a row may also be randomized. That is to say, the position of elements in a row relative to the row centerline elements may be advanced or retarded randomly. For both sorts of randomizations, practical considerations can force the pattern to be repeated after some number of randomizations.

The results given above for drag reductions are a consequence of applying a patterned material to only the floor of the test section of the wind tunnel. If patterned material were applied to all of wall of ducts and pipes, for example, the drag reduction achieved (based on non-linear considerations) should exceed the simple intuitive doubling of the drag decrease. At optimal conditions, (7 m/sec for the example given), a drag reduction in excess of 27% may be expected. A similar enhancement of mixing can be expected when the appropriate pattern is supplied to all walls.

The advantages and improved results furnished by the method and apparatus of the present invention are apparent from the foregoing description of the preferred embodiment of the invention. Various changes and modifications may be made Without departing from the spirit and scope of the invention as described in the appended claims.

What is claimed is:

1. Apparatus for decreasing turbulent drag in a turbulent wall region of a fluid flow field adjacent the surface of a wall, wherein said turbulent wall region is characterized by a system of roll pairs or steaks adjacent said surface, said roll pairs or streaks having a diameter functionally related to the strength of the flow, said apparatus including a two-dimensional array of protrusions on, or cavities in, said surface for introducing into said wall region a passive disturbance that inhibits the creation of said roll pairs, wherein said protrusions, or cavities, are arranged in successive columns perpendicular to the direction of fluid flow, the protrusions, or cavities, of a succeeding row being staggered relative to the protrusions, or cavities, of a preceding row.

2. Apparatus according to claim 1 wherein said protrusions are staggered regularly.

3. Apparatus according to claim 1 wherein said protrusions, or cavities, of a succeeding row are staggered randomly relative to the protrusions, or cavities, of a preceding row.

4. Apparatus according to claim 1 wherein said protrusions project into the flow a distance in the range 5 to 15 wall units, where a wall unit is the viscosity divided by the square root of the density and shear stress.

5. Apparatus according to claim 4 wherein said protrusions are V-shaped, the apices of the protrusions being directed upstream of the direction of flow.

6. Apparatus according to claim 5 wherein the apex angle of said protrusions is in the range 20°–90°.

7. Apparatus according to claim 5 wherein the pitch of the protrusions in rows is in the range one protrusion to about 200–300 wall units.

8. Operators according to claim 5 wherein the pitch of the protrusions in the direction of flow is in the range one row per 200–400 wall units.

9. Apparatus according to claim 5 wherein the dimension of the protrusions in the direction of flow is in the range 150–250 wall units.

10. Apparatus for increasing turbulent drag in a turbulent wall region of a fluid flow field adjacent the surface of a wall, wherein said turbulent wall region is characterized by the natural system of roll pairs or steaks adjacent said surface, said roll pairs or streaks having a diameter functionally related to the strength of the flow, said apparatus including a two-dimensional array of protrusions on, or cavities in, said surface, said array being constructed and arranged to introduce into said wall region a passive disturbance that enhances the creation of said roll pairs.

11. Apparatus according to claim 10 wherein said array includes a plurality of protrusions arranged in successive rows perpendicular to the direction of fluid flow, the protrusions of a succeeding row being aligned with the protrusions of a preceding row.

12. Apparatus according to claim 11 wherein said protrusions project into the flow a distance in the range 5 to 15 wall units, where a wall unit is the viscosity divided by the square root of the density and shear stress.

13. Apparatus according to claim 11 wherein said protrusions are V-shaped, the apices of the protrusions being directed upstream of the direction of flow.

14. Apparatus according to claim 13 wherein the apex angle of said protrusions is in the range 20°–90°.

15. Apparatus according to claim 5 wherein the pitch of the protrusions in a row is in the range one protrusion per 200–300 wall units.

16. Apparatus according to claim 5 wherein the pitch of the protrusions in the direction of flow is in the range one row per 200–400 wall units.

17. Apparatus according to claim 5 wherein the dimension of the protrusions in the direction of flow is in the range 150–250 wall units.

18. Apparatus for decreasing turbulent drag in a turbulent wall region of a fluid flow field adjacent the surface of a wall comprising a two-dimensional array of V-shaped protrusions on said surface arranged in successive columns perpendicular to the direction of fluid flow, the position of the protrusions in a row being randomized.

19. Apparatus according to claim 18 wherein said projections have a thickness in the range of about 5 wall units where a wall unit is the viscosity of the fluid divided by the square root of the product of the fluid density and the shear stress.

20. Apparatus for decreasing turbulent drag in a turbulent wall region of a fluid flow field adjacent the surface of a wall comprising a two-dimensional array of V-shaped protrusions on said surface arranged in successive columns perpendicular to the direction of fluid flow, the protrusions of a succeeding row being staggered relative to the protrusions of a preceding row, the apices of the projections being directed upstream of the direction of flow, the apex angle of the projections being in the range 20°–90°, the dimension of the protrusions in the direction of flow being in the range 150–200 wall units where a wall unit is the viscosity of the fluid divided by the square root of the product of the fluid density and the shear stress, the pitch of the protrusions in a given row being in the range 200–300 wall units, and the pitch of the rows of protrusions in the direction of flow being in the range 200–400 wall units.

21. Apparatus according to claim 20 wherein the staggering of successive rows of protrusions is random.

22. Apparatus according to claim 21 wherein said projections have a thickness in the range of about 5 wall units.

23. Apparatus for increasing turbulent drag in a turbulent wall region of a fluid flow field adjacent the surface of a wall comprising: a two-dimensional array of V-shaped protrusions on said surface arranged in successive columns perpendicular to the direction of fluid flow, the protrusions of a succeeding row being aligned with the protrusions of a preceding row, the apices of the projections being directed upstream of the direction of flow, the apex angle of the projections being in the range 20°–90°, the dimension of the protrusions in the direction of flow being in the range 150–200 wall units where a wall unit is the viscosity of the fluid divided by the square root of the product of the fluid density and the shear stress, the pitch of the protrusions in a row being in the range 200–300 wall units, and the pitch of the protrusions in the direction of flow being in the range 200–400 wall units.

24. Apparatus according to claim 10 wherein said array includes a plurality of cavities arranged in successive rows perpendicular to the direction of fluid flow, the cavities of a succeeding row being aligned with the cavities of a preceding row.

25. Apparatus according to claim 24 wherein said cavities are V-shaped, the apices of the cavities being directed upstream of the direction of flow.

26. Apparatus for decreasing turbulent drag in a turbulent wall region of a fluid flow field adjacent the surface of a wall comprising a two-dimensional array of V-shaped cavities on said surface arranged in successive columns perpendicular to the direction of fluid flow, the cavities of a succeeding row being staggered relative to the cavities of a preceding row, the apices of the cavities being directed upstream of the direction of flow, the apex angle of the cavities being in the range 20°–90°, the dimension of the cavities in the direction of flow being in the range 150–200 wall units where a wall unit is the viscosity of the fluid divided by the square root of the product of the fluid density and the shear stress, the pitch of the cavities in a given row being in the range 200–300 wall units, and the pitch of the rows of cavities in the direction of flow being in the range 200–400 wall units.

27. Apparatus according to claim 26 wherein the staggering of successive rows of cavities is random.

28. Apparatus according to claim 27 wherein said cavities have a depth in the range of about 5 wall units.

29. Apparatus for increasing turbulent drag in a turbulent wall region of a fluid flow field adjacent the surface of a wall comprising: a two-dimensional array of V-shaped cavities on said surface arranged in successive columns perpendicular to the direction of fluid flow, the cavities of a succeeding row being aligned with the cavities of a preceding row, the apices of the cavities being directed upstream of the direction of flow, the apex angle of the cavities being in the range 20°–90°, the dimension of the cavities in the direction of flow being in the range 150–200 wall units where a wall unit is the viscosity of the fluid divided by the square root of the product of the fluid density and the shear stress, the pitch of the cavities in a row being in the range 200–300 wall units, and the pitch of the cavities in the direction of flow being in the range 200–400 wall units.

* * * * *